Figure 1:
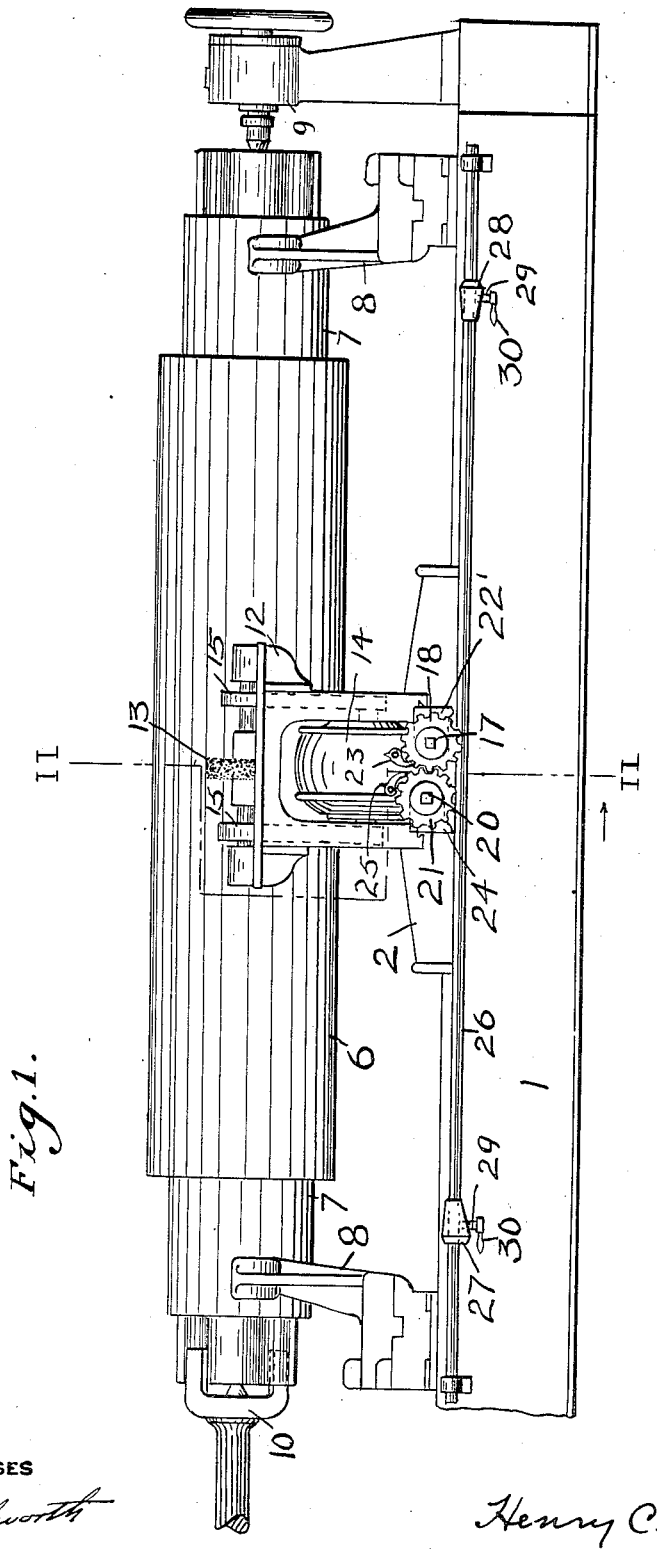

H. C. SHAW.
GRINDING MACHINE.
APPLICATION FILED JUNE 5, 1913.

1,171,894.

Patented Feb. 15, 1916.
2 SHEETS—SHEET 1.

WITNESSES
R. F. Dilworth
Elva Staniek.

INVENTOR
Henry C. Shaw
by F. N. Barber
attorney

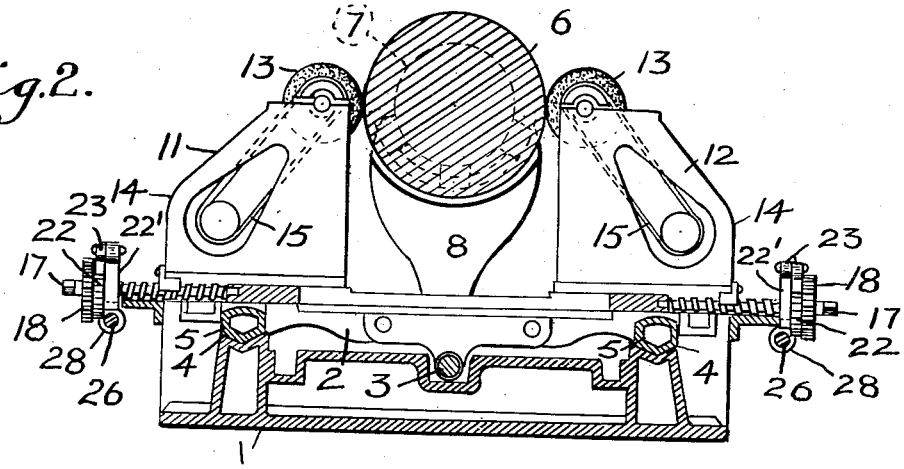
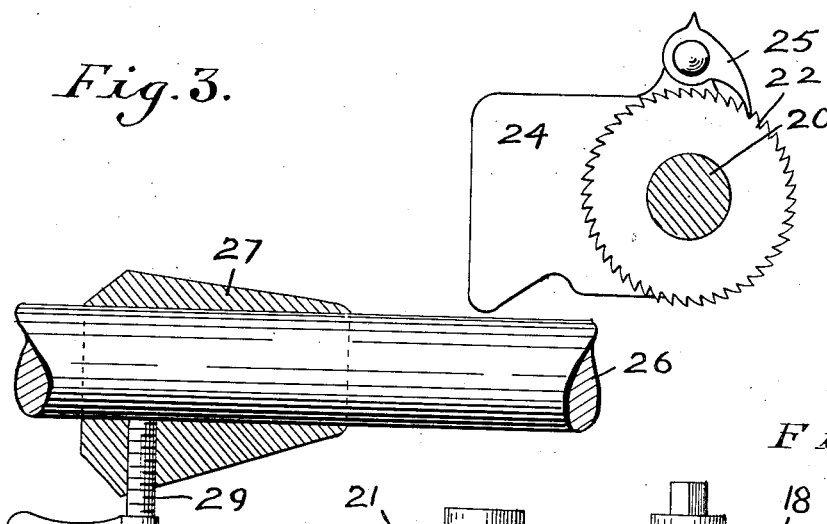
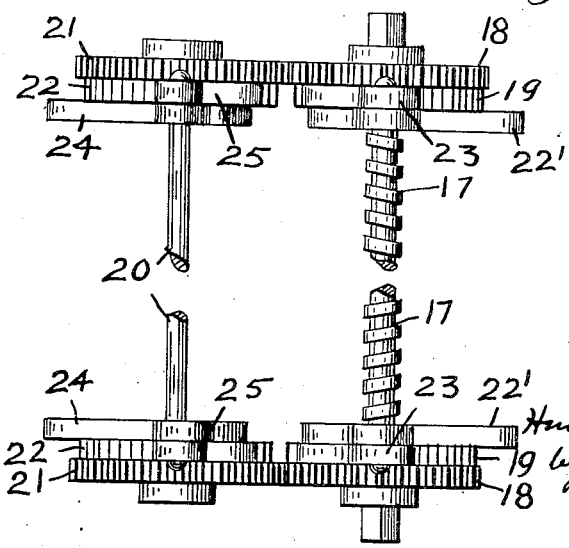

UNITED STATES PATENT OFFICE.

HENRY C. SHAW, OF SEWICKLEY, PENNSYLVANIA; GEORGE E. SHAW, ADMINISTRATOR OF THE ESTATE OF SAID HENRY C. SHAW, DECEASED, ASSIGNOR TO A. GARRISON FOUNDRY COMPANY, OF PITTSBURGH, PENNSYLVANIA, A CORPORATION OF PENNSYLVANIA.

GRINDING-MACHINE.

1,171,894.   Specification of Letters Patent.   Patented Feb. 15, 1916.

Application filed June 5, 1913. Serial No. 771,835.

*To all whom it may concern:*

Be it known that I, HENRY C. SHAW, a citizen of the United States, residing at Sewickley, in the county of Allegheny and State of Pennsylvania, have invented new and useful Improvements in Grinding-Machines, of which the following is a specification.

My invention relates to roll grinding machines, and its object is to provide improvements in the mechanism for feeding the grinding feed carriages automatically toward the roll at the termination of their travel longitudinally of the roll.

Another object is to provide a means for adjusting the cross-feed of the said carriages to any amount between certain limits.

Other objects will appear hereinafter.

Referring to the accompanying drawings, Figure 1 is a side view of a roll in connection with my improved grinding machine; Fig. 2, a cross-section of Fig. 1 on the line II—II; and Fig. 3, an enlarged view showing my preferred means for adjusting the cross-feed of the carriages which support the grinding wheels. Fig. 4 is a plan view of the cross-feeding devices for the carriages 11 and 15. Fig. 5 is a cross-section of the shaft 20, which supports a portion of the cross-feed devices shown in elevation.

On the drawings, 1 is the bed on which the main carriage 2 is fed longitudinally in any suitable manner, for example, by the feed screws 3 driven in a manner well known to those conversant with reciprocating tables fed by screws. I have shown the bed 1 provided at each side with a channel guide 4, in which the guide bars or rails 5 on the under side of the carriage 2 lie to support and guide the carriage 2.

6 represents a roll having its necks 7 supported by the yokes 8, which are supported on the bed 1.

9 is a tail-stock and 10 is the head-stock, the mechanism for rotating the latter being old and well known.

11 and 12 are the cross-feed carriages arranged on opposite sides of the roll 6 and supported by the main carriage 2. Each carriage 11 and 12 supports a rotating grinding wheel 13 driven by a separate motor 14 which drives its respective grinding wheel by means of a belt 15. Each carriage 11 and 12 is fed crosswise of the roll 6 by means of the feed-screws 17, one of the screws having a right-hand thread and the other a left-hand thread, so that the simultaneous rotation of both screws in the same direction will feed the carriages 11 and 12 both toward the roll 6 or both away from the same. Each screw 17 has fixed thereon a gear wheel 18 and a ratchet wheel 19. The shaft 20 extends across the carriage 2 and has fixed thereon the gear wheels 21 and the ratchet wheels 22. At each side of the carriage 2, the gear-wheels 18 and 21 intermesh. Loosely mounted on the screws 17 are the blocks 22' provided with the pawls 23 which coöperate with the teeth of the ratchet wheels 19, and loosely mounted on the shaft 20 are the blocks 24 provided with the pawls 25 which coöperate with the ratchet wheels 19 and 22. The blocks 22' and 24 at each side of the carriage 2 extend in opposite directions from each other, the blocks 22' projecting toward the tail-stock, while the blocks 24 project toward the head-stock.

At each side of the bed 1, I provide the rod 26 lying parallel with the travel of the carriage 2. Each rod has the collars, or sleeves 27 and 28, one on either side of each pair of blocks 22' and 24. The collars have their sides or peripheries taper with their smaller ends facing each other. The collars are preferably not true frustums of cones, but have what may be called a conoidal form. Imaginary straight lines drawn from various points around the collars and coinciding with the surface of the collars and cutting the center line of the rod 26 on which the collars are will make different angles with the said center line. The material of the collars is arranged around the rods 26 so that in cross-section the collars appear like eccentrics on the rods. The collars are secured to the rods 26 by the set-screws 29 provided preferably with the handles 30. The lower outer corners of the blocks 22' are arranged so as to engage with the small ends of the collars 28 and ride up on their inclined surfaces when the carriage 2 reaches the right-hand limit of its travel, and the lower outer corners of the blocks 24 are arranged so as to engage with, and ride up on, the inclined side of the collars 27 when the carriage reaches the opposite limit of its travel.

Let it be assumed that the roll 6 is rotated on the yokes 8 by power applied to the head-stock 10; that the carriage or table 2 is caused to travel to the left by power applied to the feed-screw 3; and that the motors 14 are driving the grinding-wheels 13 which are in contact with the roll 6. When the blocks 24 engage the collars, they ride up on the same, causing the blocks to swing on the rod 20 and the pawls 25 to rotate the ratchet wheels 22 and the gear wheels 21. The latter rotate the gear wheels 18, which rotate the screws 17 toward the left (Figs. 1 and 4) and cause the carriages 11 and 12 to be fed slightly toward the roll 6. At this time the carriage 2 is caused to reverse its travel. When the carriage 2 reaches the right-hand limit of travel, the collars 28 cause the blocks 22' to rotate, the pawls 23 driving the ratchet wheels 19 and, consequently, causing the screws 17 to be rotated still farther toward the left, whereby the carriages 11 and 12 are again fed slightly toward the roll 2. The carriage 2 is again reversed, and the cycle of operations described is repeated until the grinding operation has been completed, when a wrench or a handle is applied to the squared end of the shaft 20 or one of the screws 17 and rotated so as to cause the screws to move the carriages 11 and 12 away from each other and the roll 6.

It is seen that the eccentric cam collars 27 and 28 can be set at such places on the rods 26 as to cause the carriages 11 and 12, and, consequently, the grinding-wheels 13, to be fed toward the roll or toward each other whenever desired, according to the length of the roll to be ground or other requirements. Also, it will be noted that the degree of rotation of the feed-screws 17 can be readily varied by rotating the collars on the rods 26 the necessary distance. It will be seen that the screws will be rotated a less distance after riding on the cam surface on the upper side of the collar 27 (Fig. 3) than they would after riding on the surface adjacent to the screw 29, where the cam surfaces rise to the greatest distance from the rod 26.

The employment of a grinding wheel on each side of the roll has marked advantages over the employment of a grinding wheel on only one side of the roll. The ways in which the bed or table 2 travel are made strictly parallel. The roll is at first approximately centered between the grinding rolls 13, which are then out of touch with the roll. The carriages 11 and 12 are then moved toward the roll until one or both grinding wheels 13 engage the same. If only one grinding wheel should engage the roll, the latter is shifted slightly until it is centrally located so that both wheels 13 engage the roll. The table 2 is then caused to travel lengthwise on the ways 4, and the roll is shifted as may be necessary to cause both rolls to engage the opposite sides of the roll simultaneously along its entire length. In case the roll is somewhat tapering, the roll would be adjacent at the larger end or place so as to be engaged by both wheels 13, and at its smaller end or place so that the wheels 13 are equally distant from the roll. It is thus seen that by the use of the two wheels 13 at opposite sides of the roll, and by having them fed simultaneously equal distances and by having the carriages on which the grinding wheels travel, travel in exact parallel paths lengthwise of the roll or other object to be ground, the roll can be ground into true cylindrical form. With a single grinding wheel, this could not in all cases be accomplished. To illustrate, if the roll is tapered, the single wheel would grind parallel with the taper, and not on a surface parallel with the axis of the roll.

It will be seen that, by employing motors on the carriages 11 and 12 for driving the grinding-wheels, I do away with the overhead belts and pulleys which have heretofore been used for driving the grinding wheels and which prevented the free use of an overhead crane for placing the roll 6 on the saddles 8 and removing it therefrom.

While I have described my invention with great detail, I do not desire to be limited to the precise details or their combinations but wish to cover such modifications as come fairly within the scope of the appended claims.

I claim—

1. In a roll-grinding machine, means for supporting the roll, a table having limited travel longitudinally of the roll, a carriage supported by the table, a screw for feeding the carriage toward the roll, a pair of intermeshing gear-wheels, one being secured to the screw, a ratchet wheel rigid with each gear wheel, pawls for driving the ratchet wheels in opposite directions, means for operating one pawl at one limit of travel of the table, and means for operating the other pawl at the other limit of travel of the table.

2. A traveling table, a carriage thereon, a screw for moving the carriage transversely of the travel of the table, a ratchet wheel secured to the screw, a pawl for rotating the screw, and a cam sleeve adjustable longitudinally of the travel of the table, for operating the pawl when the table reaches a predetermined position.

3. A traveling table, a carriage thereon, a screw for moving the carriage transversely of the travel of the table, a ratchet wheel secured to the screw, a pawl for rotating the screw, a tapered sleeve, and a carrier for supporting and actuating the pawl, arranged to engage the sleeve and ride up the tapered surface thereof when the table reaches a predetermined position.

4. A traveling table, a carriage thereon, a screw for moving the carriage transversely of the travel of the table, a ratchet wheel secured to the screw, a pawl for rotating the screw, a tapered rotary eccentric sleeve, a carrier for supporting and actuating the pawl, arranged to engage the sleeve and ride up the tapered surface thereof when the table reaches a predetermined position, and means for preventing the sleeve from rotation.

5. In a roll-grinding machine, means for supporting the roll, a table having limited travel longitudinally of the roll, a carriage on each side of the roll, provided with a grinding wheel and supported by the table, a separate screw for feeding each carriage, a gear wheel on each screw, a shaft supported by the table and provided with gear-wheels meshing with the first gear-wheels, and cams for automatically feeding the carriages toward the roll at predetermined positions of the table.

6. In a grinding machine for cylinders, means for supporting the cylinder, a table having travel longitudinally of the cylinder, two carriages mounted on the table and on opposite sides of the cylinder, means for feeding the carriages toward the cylinder, grinding-wheels mounted on the carriages, rotatable shafts to which the grinding-wheels are fastened, separate motors for rotating the shafts, and two driving connections between each motor and the shaft driven thereby, the driving connections for each shaft being arranged at opposite sides of the grinding-wheel thereon.

7. A traveling table, a carriage thereon, means for moving the carriage transversely of the travel of the table, and means for adjusting the action of the moving means, the last means including a cam adjustable lengthwise of the table.

Signed at Pittsburgh, Pa., this 24th day of May, A. D. 1913.

HENRY C. SHAW.

Witnesses:
F. N. BARBER,
CHAS. A. WALDSCHMIDT.